Aug. 26, 1941.  R. B. BATTAGLIA  2,253,603
TIRE VULCANIZING MATRIX
Filed Oct. 2, 1939
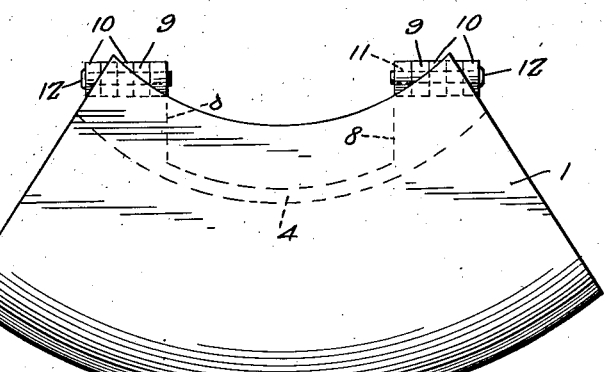
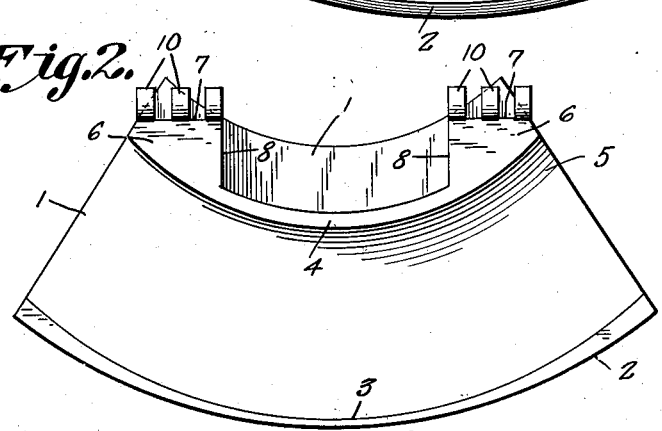
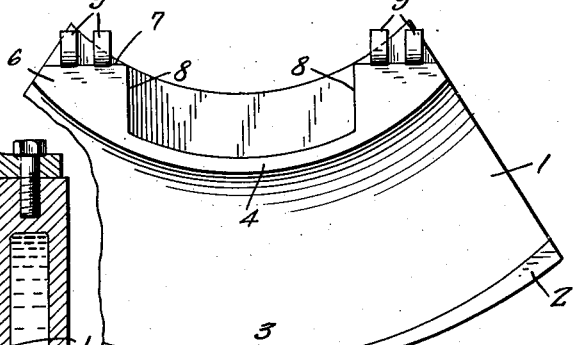
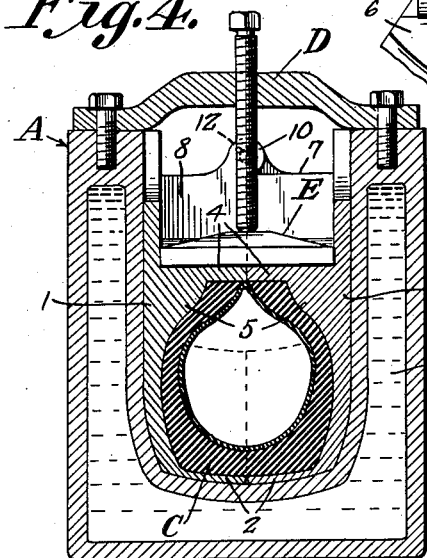
Robert B. Battaglia,
INVENTOR
BY Victor J. Evans & Co.
ATTORNEYS Patented Aug. 26, 1941

2,253,603

UNITED STATES PATENT OFFICE 2,253,603

TIRE VULCANIZING MATRIX

Robert B. Battaglia, Lake Charles, La.

Application October 2, 1939, Serial No. 297,621

1 Claim. (Cl. 18—18)

This invention relates to matrices or molds for tire repairing vulcanizing apparatus, and its general object is to provide a matrix that is composed solely of a pair of companion sections, each including a tire bead engaging portion integral therewith, as distinguished from the matrices now in general use, that include separate bead plates which disfigure the tire by forming depressions therein, while my matrix not only entirely eliminates bead plate marks, but completely surrounds and encloses a transverse portion of the tire to set up a uniform pressure thereon, and that feature likewise tends to eliminate mold marks to a minimum.

A further object is to provide a matrix that includes a pair of like companion sections detachably and hingedly connected together, against any possibility of endwise movement relative to each other, yet the sections can be applied and removed with respect to the tire, in an easy and expeditious manner.

Another object is to provide a matrix of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation of the matrix or mold which forms the subject matter of the present invention.

Figure 2 is a view looking toward the inner side of one of the sections of my matrix.

Figure 3 is a similar view of the other section.

Figure 4 is a vertical sectional view taken through a vulcanizing apparatus and illustrates my matrix in use.

Referring to the drawing in detail, the letter A indicates a tire repairing vulcanizing apparatus of the type that includes spaced inner and outer walls providing a chamber B for liquid to be heated by a suitable source, the inner wall providing a pocket for fittingly receiving my mold which is held therein and in clamping association with the tire C by a clamp D that includes a pressure plate E adapted to bear against the upper wall of the matrix, as clearly shown in Figure 4.

The matrix or mold which forms the subject matter of the present invention is made up of a pair of companion substantially identical arcuate sections, each providing a half of the matrix and including a side wall 1 that is flat for the major portion of its outer surface and to the upper curved edge thereof, but the lower portion of the side wall is rounded and has formed thereon a bottom wall portion 2. The portions 2 are of course curved both longitudinally and transversely to follow the curvature of the tread of the tire and have their longitudinal edges disposed in engagement with each other when the matrix is in use, to provide the complete bottom wall of the matrix, as shown in Figure 4. The bottom wall portions 2 are reduced in curved formation from their ends to the centers thereof to provide a relatively thin central portion 3 to facilitate the passage of heat therethrough, as will be apparent upon inspection of Figures 2 and 3.

Formed on the inner surface of the side wall of each section below the upper edges thereof is a top wall portion 4 that is curved longitudinally and at the juncture of the top wall portion 4 with the side wall 1, the matrix is thickened to provide a portion 5 for engaging the outer surface of the bead of a tire. It will be obvious that the portions 5 take the place of the separate bead plates of molds and matrices now in general use, and together with the inner surface of the top wall portions are shaped to follow and engage the lateral and inner rim engaging faces of the tire beads, as shown in Figure 4. The top wall portions have flat inner edges for disposal in engagement with each other when the matrix is in use, so that it will be seen that my matrix completely surrounds and encloses a transverse portion of the tire, thus providing a uniform pressure thereon. That feature coupled with the integral tire bead engaging portions 5 eliminate mold marks to a minimum and makes it possible to vulcanize a patch that is hard to detect.

Formed on the top wall portions 4 and rising from the ends thereof are block portions 6 having flat upper faces 7 and flat inner faces 8. The upper faces of the block portions of one section, each have a pair of spaced disk like hinge elements 9 formed on and rising therefrom, while the upper face of the block portions of the other section each have three spaced disk like hinge elements 10 formed thereon for cooperation with the elements 9. The hinge elements are directed outwardly and the elements 9 are fittingly received within the spaces between the elements 10 to prevent endwise movement of the sections. The elements 9 and 10 are provided with openings 11 to receive hinge pins 12.

The block portions 6 not only provide base means for the hinge elements, but the flat inner faces 8 thereof cooperate with the top wall portions 4 and those portions of the side walls above the top wall portions to provide a pocket for receiving the pressure plate E, as shown in Figure 4.

From the above description and disclosure in the drawing, it will be obvious that I have provided a matrix that positively eliminates bead plate marks, and endwise movement of the matrix within the vulcanizing apparatus or like movement of the sections relative to each other, is practically impossible.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A matrix for a tire repairing vulcanizing apparatus, comprising a pair of companion substantially identical sections, each constituting a half of the matrix and including bottom, top and side wall portions, said bottom wall portions decreasing in thickness from the ends thereof to their centers to provide a relatively thin central portion for the bottom wall, said side wall portions extending above the top wall portions, block portions formed on the side and top wall portions and rising from the latter for cooperation with each other and the top and side wall portions to provide a clamp plate receiving pocket, hinge means on the block portions for connecting the sections together for the disposal thereof in complete surrounding relation to a transverse portion of the tire, and said top wall portions being of a width to contact each other and shaped to follow and engage the entire rim engaging faces of the beads of the tire.

ROBERT B. BATTAGLIA.